United States Patent [19]

Arkles et al.

[11] 4,110,186

[45] Aug. 29, 1978

[54] FLUORINATED ETHYLENE-PROPYLENE COPOLYMER POWDERS HAVING IMPROVED ADHESION TO SUBSTRATES AND METHOD

[75] Inventors: Barry C. Arkles, Oreland; Stephen Gerakaris, Havertown, both of Pa.

[73] Assignee: Beatrice Foods Co., Chicago, Ill.

[21] Appl. No.: 577,128

[22] Filed: May 13, 1975

[51] Int. Cl.² ................................................ C08F 2/54
[52] U.S. Cl. ............................... 204/159.20; 427/36; 427/180; 427/185; 427/195; 428/421; 428/463; 526/18; 526/58
[58] Field of Search .................... 204/159.20; 427/36, 427/180, 185, 195; 428/421, 463

[56] References Cited

U.S. PATENT DOCUMENTS

| | | | |
|---|---|---|---|
| 3,116,226 | 12/1963 | Bowers | 204/159.20 |
| 3,650,827 | 3/1972 | Brown et al. | 428/421 |
| 3,840,619 | 10/1974 | Arnoff et al. | 260/878 R |
| 3,846,267 | 11/1974 | Tabata et al. | 204/159.17 |
| 3,878,164 | 4/1975 | Lott | 260/42.27 |
| 3,894,118 | 7/1975 | Arnoff et al. | 260/884 |
| 3,962,373 | 6/1976 | Petrucelli | 260/900 |

*Primary Examiner*—Murray Tillman
*Assistant Examiner*—Thurman K. Page
*Attorney, Agent, or Firm*—Seidel, Gonda & Goldhammer

[57] ABSTRACT

Melt-processible fluorinated ethylene-propylene copolymer powders may be rendered more adherent to substrates, particularly metal substrates, by irradiating the copolymer powder with about 0.5 to 6 megarads of radiation, and preferably about 2 to 4 megareds. The copolymer powder should have a maximum particle size of about 420 microns, and the particles should preferably range in diameter from about 177 to 420 microns. The irradiation increases the melt index of the copolymer, preferably by a factor of about 2 to 10. As a result, the powder has improved flow properties and may be more easily milled to a smaller particle size for application to a substrate. The adhesion of the irradiated powder to metal substrates is improved by a factor of about 2 to 3.

13 Claims, No Drawings

FLUORINATED ETHYLENE-PROPYLENE COPOLYMER POWDERS HAVING IMPROVED ADHESION TO SUBSTRATES AND METHOD

BACKGROUND OF THE INVENTION

The present invention relates to fluorinated ethylene-propylene copolymer powders having improved adhesion to substrates and a method of producing the improved powders. More particularly, the invention is directed to the irradiation of melt-processible fluorinated ethylene-propylene copolymer powders to improve the adhesion of the powders to metal substrates.

Fluorinated ethylene-propylene copolymers (generally referred to as FEP resins) are copolymers of tetrafluoroethylene and hexafluoropropylene and have properties similar to polytetrafluoroethylene resin. The repeating structure of the molecule may be represented as follows:

Fluorinated ethylene-propylene copolymers have a number of excellent chemical and physical properties, including frictional, release and electrical properties and chemical resistance. These properties have resulted in the use of FEP resins as surface coatings on a variety of substrates, particularly metal substrates such as cooking utensils and the like. On the other hand, these same properties combine to make it difficult to adhere the copolymers to substrates. As a result, under dynamic conditions, the durability of the coated products is very poor.

Several approaches have been employed in attempts to improve the adhesion of FEP to substrates. For example, a film of FEP may be prepared in a form such that it may be expanded, placed over the substrate, and then subjected to heat to cause plastic memory shrink (heat shrinking). Using this technique, the mechanical strength of the polymer is exploited.

A second approach is to "etch" a sheet of FEP resin with an alkali metal organic compound, such as sodium naphthalene, sodium toluene, butyl lithium, or a variety of other compounds which will remove fluorine from the surface of the copolymer sheet. As a result, the "etched" surface has a much greater affinity for adhesives or for the substrate itself at elevated temperatures. Unfortunately, this method is time consuming, unsuitable for elaborate shapes, and can result in undesired modifications of the desirable properties of the FEP resin.

In any event, the two techniques cited above for improving coating durability are not applicable where the coating is to be applied in powder form. Thus, where it is desired to achieve a coating film thickness below 30 mils, the preferred method of coating is by powder application. A variety of powder application techniques are available, including particularly electrostatic spray, fluidized bed, electrostatic fluidized bed, and flocking.

Efforts to improve the adhesion of FEP powder to substrates have concentrated on preparation of the substrate surface and the utilization of primers. While these approaches have effected improvements in adhesion, satisfactory adhesion is still not obtained in many cases. These methods also necessarily involve extra manufacturing steps.

Furthermore, the use of primers is often not practical or compatible with powder application. Thus, many parts or products are coated by powder application simply because even application is difficult using a liquid dispersion of the FEP resin. Since primers are usually liquids, their use is also difficult in such cases.

BRIEF SUMMARY OF THE INVENTION

According to the present invention, the affinity of melt-processible FEP powders for a variety of substrates, particularly metal substrates, is enhanced by subjecting the dry FEP powder to radiation of about 0.5 to 6 megarads, and preferably about 2 to 4 megarads. The irradiation not only improves adhesion to substrates, but also improves the flow properties of the powder. Also, after irradiation the powder is more easily ground or milled. Moreover, after the powder is fused on a substrate, the reactivity of the powder is completely eliminated. The invention includes both the method for treating the powder and the resulting powder.

DETAILED DESCRIPTION OF THE PREFERRED EMBODIMENTS

Melt-processible flourinated ethylene-propylene copolymers may be made by methods generally known in the art, and are readily commercially available from several companies, particularly E. I. du Pont de Nemours & Co. of Wilmington, Delaware. The usual commercially available FEP resins have a ratio of hexafluoropropylene to tetrafluoroethylene of about 1:20 to 3:1.

The melt-processible FEP resins may have a melt index of about 2 to 40 grams per ten minutes, as determined by the procedure of ASTM D1238 at 372° C. and five kilograms load. Preferably, the melt index is about 5 to 25 grams per ten minutes, which is the usual range of commercially available FEP resins.

The melt viscosity of the FEP resin may vary over a wide range. However, the higher the melt viscosity, the more the irradiation that will be necessary in order to produce a good affinity of the FEP powder for the substrate.

In order to achieve irradiation, the particle size of the powder should not be too large. It has been found that particles which pass through a 40 mesh U.S. standard sieve (i.e., maximum particle diameter of about 420 microns) may be satisfactorily irradiated to achieve improved affinity for substrates.

On the other hand, very fine particle sizes, such as below 0.5 microns in diameter are not generally suitable for electrostatic spray application to substrates. Particle sizes in the range of about 1 to 250 microns are generally preferred.

The irradiation of the powder is preferably carried out by either by electron beam or a cobalt 60 source. Although other radiation sources are available, commercial irradiation is currently limited to these two methods. According to the present invention, the dry powder is given a dose of about 0.5 to 6 megarads of radiation, and preferably about 2 to 4 megarads.

The irradiation may be carried out in any of a number of ways. For example, the dry powder may be placed in one inch trays and moved past an electron beam. Where a cobalt 60 source is used, the dry powder may be simply placed in a chamber with the cobalt 60 for an appropriate length of time, or the dry powder may be exposed to the cobalt 60 source while the powder is in a fluidized bed of air prior to coating on a substrate.

Preferably, the irradiation is carried out in air, or in a gaseous oxygen-containing atmosphere. The use of a vacuum to carry out the irradiation is generally unsatisfactory.

After the powder is irradiated, the powder may be milled or ground to the desired particle size for coating on a substrate. It has been found that the irradiation has the added advantage of rendering the powder easier to grind or mill.

The irradiated powder has improved adhesion to a variety of substrates, including particularly metal substrates, such as aluminum, copper, and various grades of steel, such as various carbon steels, cold rolled steel, stainless steel, cast iron, etc. As indicated previously, the powders may be applied to the substrate by electrostatic spray, fluidized bed, electrostatic fluidized bed, flocking, or other methods which will be apparent to those skilled in the art. After application of the powder, the FEP resin is fused by heating.

As will be seen from the specific examples below, the affinity of the melt-processible FEP powders for metal substrates may be doubled or tripled, as measured by the Gardner impact test. Another advantage of the irradiation is the improved flow properties of the powder. Thus, the melt index of the powder is increased by the irradiation by a factor of about 2 to 10. As a result, the powder tends to level better when applied to the substrate and fused.

While we do not wish to be bound by any particular theory, it is believed that the irradiation of FEP resin produces relatively long-lived radicals or unstable peroxy compounds which decompose to radicals. Thus, the irradiated FEP gives an active ESR (electron spin resonance) spectrum. The spectrum remains strongly active for about three months, with limited residual activity for periods up to a year.

The activity of the irradiated FEP may at any time be enhanced by heating the FEP. However, after being heated to its melting point, all further activity disappears. It is believed that the highly reactive species or radicals can react with a variety of substrates at elevated temperatures when the FEP copolymer is in its melt state. Once in the melt state, the radicals are unstable and readily react or decompose.

The invention will now be described in more detail with reference to the following specific, non-limiting examples:

EXAMPLE I

Melt-processible FEP copolymer was obtained from E. I. du Pont de Nemours & Co. under the name FEP T-110. The copolymer had a melting point of 533° K, indicating a $CF_3/C$ ratio of 0.075. The FEP pellets were ground to a particle range of −40 to +80 mesh (i.e., through 40 mesh and retained on 80 mesh U.S. standard sieves). This corresponded to particles having diameters in the range of about 177 microns to 420 microns. The resulting powder was subjected to 3.6 megarads of irradiation by electron beam in the presence of air. The melt index of the powder prior to irradiation was 18–22 grams per 10 minutes (ASTM D1238 at 372° C. and 5 kilograms load), whereas the melt index after irradiation was 82–90 grams per 10 minutes. The particle size was then further reduced to −120, +160 mesh in several passes using liquid nitrogen as a coolant.

Two control samples of FEP powder were processed similarly. One control sample was processed the same way, but without irradiation. The other control sample was irradiated as above, but after irradiation was re-extruded (i.e., fused), and after fusing was again formed into a powder without further irradiation.

16 gauge cold-rolled steel panels were sand blasted, and each of the three FEP samples was applied to one of the panels by electrostatic application at a negative charge of 90 kilovolts. The applied powder samples were then fused on the steel panels by heating to 650° F. for 2 hours. Other panels were also prepared by preheating to 675° F. dipping the panes into an air-fluidized bed of the powder, and fusing the coated panels at 650° F. for 2 hours.

The Gardner impact test values for the panels were 60 in.-lbs. for the non-irradiated control sample, 55 in.-lbs. for the irradiated and re-extruded control sample, and 160 in.-lbs. for the irradiated powder according to the present invention.

EXAMPLE II

Similar results were obtained when Example I was repeated using −40, +80 mesh melt-processible Du Pont FEP T-110 powder which was given a 4 megarad dose of irradiation in air using a cobalt 60 source.

EXAMPLE III

Melt processible Du Pont FEP T-100 pellets, having a melting point of 548° K. ($CF_3/C$ ratio = 0.058) and an observed melt index of 8–12 grams per 10 minutes, were reduced to −40, +80 mesh. After exposure to 3.0 megarads of irradiation using an electron beam in air, the powder had a melt index of 28–30 grams per ten minutes. After further milling and classifying, as in Example I, the powder was applied to a metal substrate and fused. The resulting Gardner impact value showed a two-fold improvement over a similarly processed, non-irradiated control sample.

EXAMPLE IV

A sample of FEP powder, obtained from Daikin Kogyo, having a melt index of 8–12 grams per ten minutes and an average particle size of 5 microns was provided. After exposure of the powder to a 1.0 megarad dose of irradiation by an electron beam, the final melt index was 52–60 grams per ten minutes. Upon application to a metal substrate and fusing of the powder, the Gardner impact values showed a three-fold improvement in adhesion, as compared to a similarly processed, non-irradiated control sample.

The present invention may be embodied in other specific forms without departing from the spirit or essential attributes thereof and, accordingly, reference should be made to the appended claims, rather than to the foregoing specification as indicating the scope of the invention.

We claim:

1. A method of improving the adhesion of a melt-processible fluorinated ethylene-propylene copolymer to metal substrates, comprising irradiating a dry powder consisting essentially of melt-processible tetrafluoroethylene-hexafluoropropylene copolymer with about 0.5 to 6 megarads of radiation in a gaseous oxygen-containing atmosphere to increase the melt index of the copolymer.

2. A method according to claim 1 wherein the powder has a maximum particle diameter of about 420 microns.

3. A method according to claim 2 wherein the powder has particle diameters in the range of about 1 to 250 microns.

4. A method according to claim 1 wherein the copolymer has a hexafluoropropylene to tetrafluoroethylene ratio of about 1:20 to 3:1 and a melt index at 372° C. and five kilograms load of about 2 to 40 grams/10 minutes before irradiation.

5. A method according to claim 1 wherein after irradiation the powder is milled and classified to a smaller particle size.

6. A methd according to claim 1 wherein a powder having particle diameters in the range of about 177 to 420 microns is irradiated with about 2 to 4 megarads of radiation, and the particle diameter is then reduced by milling to about 90 to 125 microns.

7. A fluorinated ethylene-propylene copolymer powder made according to the method of claim 1.

8. A fluorinated ethylene-propylene copolymer powder made according to the method of claim 4.

9. A fluorinated ethylene-propylene copolymer powder made according to the method of claim 6.

10. A method according to claim 1 wherein the melt index of the copolymer is increased by the irradiation by a factor of about 2 to 10.

11. A method according to claim 1 wherein said irradiated powder is applied to a metal substrate and fused.

12. A method according to claim 11 where said irradiated powder is applied to said substrate by electrostatic spray, fluidized bed, electrostatic fluidized bed, or flocking.

13. A method according to claim 12 wherein the irradiation is carried out while the powder is in one inch trays.

* * * * *